(12) United States Patent
Utsunomiya et al.

(10) Patent No.: US 10,173,598 B2
(45) Date of Patent: Jan. 8, 2019

(54) TONNEAU COVER AND TONNEAU COVER APPARATUS

(71) Applicant: HAYASHI TELEMPU CORPORATION, Nagoya-shi (JP)

(72) Inventors: Suguru Utsunomiya, Nagoya (JP); Hironori Hayashi, Nagoya (JP)

(73) Assignee: Hayashi Telempu Corporation, Nagoya-shi, Aichi (JP)

( * ) Notice: Subject to any disclaimer, the term of this patent is extended or adjusted under 35 U.S.C. 154(b) by 23 days.

(21) Appl. No.: 15/355,563

(22) Filed: Nov. 18, 2016

(65) Prior Publication Data

US 2017/0144607 A1    May 25, 2017

(30) Foreign Application Priority Data

Nov. 19, 2015   (JP) .................................. 2015-226796

(51) Int. Cl.
*B60R 5/04*    (2006.01)

(52) U.S. Cl.
CPC .............. *B60R 5/048* (2013.01); *B60R 5/045* (2013.01); *B60R 5/044* (2013.01)

(58) Field of Classification Search
CPC ................................ B60R 5/048; B60R 5/044
USPC ............................................ 296/24.34, 37.16
See application file for complete search history.

(56) References Cited

U.S. PATENT DOCUMENTS

| 7,537,265 | B2 * | 5/2009 | Hori ........................ | B60R 5/047 296/100.15 |
| 8,011,711 | B2 * | 9/2011 | Hirayama ............... | B60R 5/047 296/136.03 |

FOREIGN PATENT DOCUMENTS

JP        2014-108666 A     6/2014

\* cited by examiner

*Primary Examiner* — Joseph D. Pape
*Assistant Examiner* — Dana D Ivey
(74) *Attorney, Agent, or Firm* — Knobbe, Martens, Olson & Bear, LLP

(57) ABSTRACT

A main body includes a front engaging part on a front side thereof. The front engaging part is engaged with an interior part of the vehicle. The main body is pivotable about the front engaging part. A first string includes a first connecting part connected to the main body rearward of the front engaging part and a first engaging part engaged with a pivotable back door. A second string includes a second connecting part connected to the main body rearward of the front engaging part and a second engaging part engaged with a vehicle main body. The first string is subjected to tension due to weight of the main body and the second string is loosened when the back door is opened. When the main body is moved to a direction that causes the first string to loosen in said state, the second string is subjected to tension.

7 Claims, 8 Drawing Sheets

TONNEAU COVER AND TONNEAU COVER APPARATUS

The present application is based on, and claims priority from, J.P. Application No. 2015-226796, filed on Nov. 19, 2015, the disclosure of which is hereby incorporated by reference herein in its entirety.

BACKGROUND OF THE INVENTION

1. Field of the Invention

The present application relates to a tonneau cover and a tonneau cover apparatus.

2. Description of the Related Art

Conventional vehicles, such as a hatch back car and a station wagon, may be provided with a back door that opens and closes the rear luggage space of the vehicle. This type of vehicle may have a tonneau cover that shields baggage in the luggage space from the outside. A tonneau cover has a sheet-shaped cover that extends substantially horizontally in the upper part of the luggage space and that shields the lower part of the luggage space. One type of the tonneau cover has a case that is provided with a take-up shaft, from which the cover is withdrawn and around which the cover is wound. Another type of the tonneau cover has a single flexible cover member that is attached to a predetermined part of the luggage space.

The latter type of the tonneau cover is disclosed, for example, in JP2014-108666. The tonneau cover can be easily attached to and removed from the luggage space by a manual operation performed by the user. Since the tonneau cover is foldable and light, a user can remove the tonneau cover from the vehicle, as needed, and operate the vehicle. Strings are connected to the tonneau cover. One end of each string is connected to the tonneau cover and the other end is connected to the back door. This arrangement allows the tonneau cover to pivot following movement of the back door so that the user can access the luggage space without having to perform any special operation. The tonneau cover returns to the horizontal state when the back door is closed.

SUMMARY OF THE INVENTION

The above-mentioned tonneau cover is easily affected by wind due to its light weight. The tonneau cover is held at a predetermined position with regard to the back door when the back door is open because the rear part of the tonneau cover is suspended by the strings. In other words, the tonneau cover keeps stationary due to its gravity and the tension of the strings. When wind blows from the backside to the front side of the vehicle in this state, or when wind blows into the vehicle, the strings are loosened, the tension of the strings are lost, and the tonneau cover is moved toward the back door from the above-mentioned position where the tonneau cover was held stationary. The tonneau cover is then caught, for example, in a stepped portion of the back door and is prevented from returning to the horizontal state when the back door is closed. The tonneau cover may shield the rear window shield, limit rear view and thereby affect safety when the vehicle is running. Moreover, the tonneau cover may be moved by wind and hit against a passenger's head.

The present invention aims at providing a tonneau cover in which unnecessary movements are restricted when the back door is opened.

According to the invention, a tonneau cover that covers a luggage space that is positioned on a rear side of a vehicle comprises: a main body that includes a front engaging part on a front side of the main body, wherein the front engaging part is engaged with an interior part of the vehicle, and the main body is pivotable about the front engaging part; a first string that includes a first connecting part that is connected to the main body at a position that is rearward of the front engaging part and a first engaging part that is engaged with a pivotable back door; and a second string that includes a second connecting part that is connected to the main body at a position that is rearward of the front engaging part and a second engaging part that is engaged with a vehicle main body that defines the luggage space. The first string is subjected to tension due to weight of the main body and the second string is loosened in a state in which the back door is opened, and when the main body is moved to a direction that causes the first string to loosen in said state, the second string is subjected to tension.

According to the invention, the second string is subjected to tension when the main body is moved to a direction that causes the first string to loosen, for example, by wind that is generated when the back door is opened. The tension of the second string limits unnecessary movements of the tonneau cover. Accordingly, the present invention provides a tonneau cover in which unnecessary movements are restricted when the back door is opened.

The above and other objects, features and advantages of the present invention will become apparent from the following description with reference to the accompanying drawings which illustrate examples of the present invention.

DETAILED DESCRIPTION OF THE INVENTION

Figure 1:
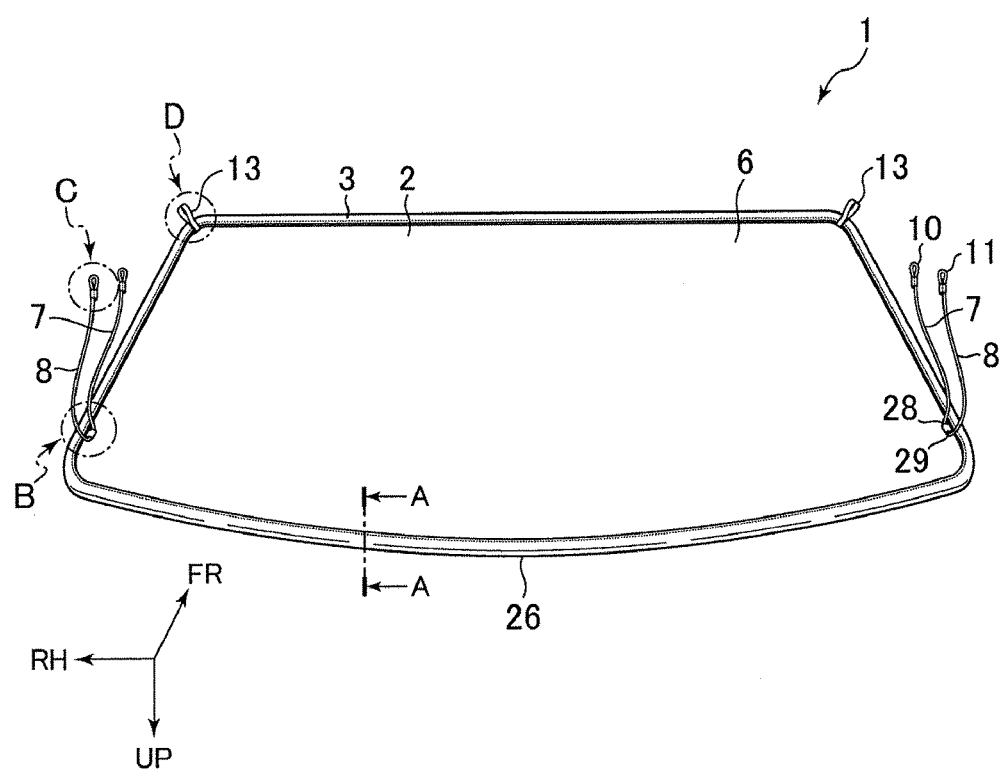
FIG. 1 is a schematic view of a tonneau cover in the unfolded state.

An embodiment of the tonneau cover and the tonneau cover apparatus that incorporates the tonneau cover according to the invention will be described in reference to the drawings. In the drawings, "FR" indicates the forward direction of the vehicle (the front side of the vehicle), "UP" indicates the upward direction in the vertical direction, "RH" indicates the rightward direction with regard to the forward direction of the vehicle (the right side in the vehicle width direction). The upper and lower surfaces of the main body of the tonneau cover and/or the tonneau cover apparatus are defined based on the state in which they are mounted on the vehicle.

FIG. 1 schematically shows the lower surface of the tonneau cover in the unfolded state. Tonneau cover 1 includes main body 6, two first strings 7, two second strings 8 and two front engaging parts 13. First strings 7, second strings 8 and front engaging parts 13 are attached to main body 6 of tonneau cover 1. Main body 6 has sheet member 2 that covers the luggage space and hemmed part 3 that surrounds sheet member 2 and that is double sewn along the periphery of sheet member 2. Sheet member 2 and hemmed part 3 are preferably made of a flexible material, such as a jersey woven fabric made of nylon or polyester. Front engaging parts 13 are provided at the front side of the lower surface of main body 6 on both sides of the vehicle width direction. Front engaging parts 13 are engaged with a vehicle interior member, such as rear seat back 14 or side walls 17 of the vehicle (see FIG. 6). Main body 6 can pivot about front engaging parts 13.

First strings 7 and second strings 8 are provided at the rear side of the lower surface of main body 6 on both sides of the vehicle width direction. The material of first strings 7 and second strings 8 is not limited, but in this embodiment, nylon is used for first strings 7 and second strings 8. First strings 7 have first engaging parts 10 at respective ends thereof. First engaging parts 10 are engaged with first engaged parts 23 (see FIG. 6) that are provided on the pivotable back door 18 (see FIG. 6). First connecting parts 28 are provided at the other ends of first strings 7. First connecting parts 28 are connected to main body 6. Second engaging parts 11 are provided at respective ends of second strings 8. Second engaging parts 11 are engaged with second engaged parts 24 (see FIG. 6) that are provided on the vehicle main body that defines the luggage space. Second connecting parts 29 are provided at the other ends of second strings 8. Second connecting parts 29 are connected to main body 6. First connecting parts 28 and second connecting parts 29 are positioned rearward of front engaging parts 13. First connecting parts 28 are positioned forward of second connecting parts 29 in the drawings, but second connecting part 29 may be positioned forward of first connecting part 28. First engaging parts 10 and second engaging parts 11 may not necessarily be formed at the ends of first strings 7 and second strings 8.

Figure 2:
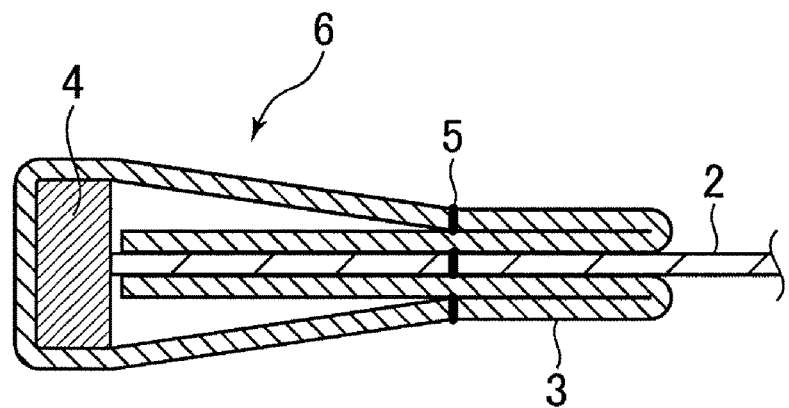
FIG. 2 is a section view cut along line A-A in FIG. 1.

FIG. 2 shows a section view cut along line A-A in FIG. 1. Metal wire 4 that can be bent and deformed is inserted through hemmed part 3. In other words, hemmed part 3 houses deformable wire 4 that extends along the periphery of sheet member 2. A user can transform tonneau cover 1 into the folded state and into the unfolded state by twisting wire 4 with his/her hand. Hemmed part 3 is sewn to sheet member 2 at sewing part 5. Sheet member 2, hemmed part 3, wire 4 and sewing part 5 form main body 6 of the tonneau cover.

Figure 3:
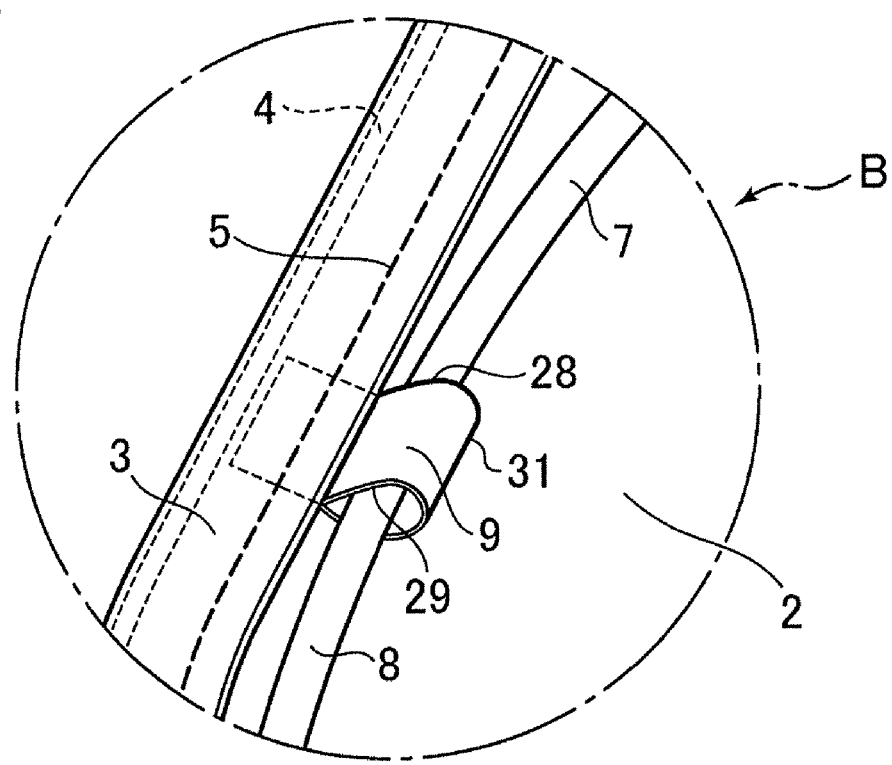
FIG. 3 is an enlarged view of portion B in FIG. 1.

FIG. 3 is an enlarged view of portion B in FIG. 1. In the embodiment, first string 7 and second string 8 are formed integral as a single continuous string. Specifically, first connecting part 28 and second connecting part 29 are formed by fixing the single string to hemmed part 3 at the middle point of the string. This leads to a reduction in parts and manufacturing steps. First string 7 and second string 8 may be formed individually.

First strings 7 and second strings 8 may be attached to tonneau cover 1 by whatever means are available. First strings 7 and second strings 8 may be directly attached to hemmed part 3 by sewing or melting or may be attached to hemmed part 3 by means of attaching element 9. In the embodiment, both ends of the ribbon-shaped attaching element 9 are inserted in hemmed part 3 together with sheet member 2, and attaching element 9 and sheet member 2 are sewn together at sewing part 5. The string (as an integral string of first string 7 and second string 8) is then inserted into ring 31 that is formed by the part of attaching element 9 that remains out of hemmed part 3, and the string is sewn to attaching element 9.

Figure 4:
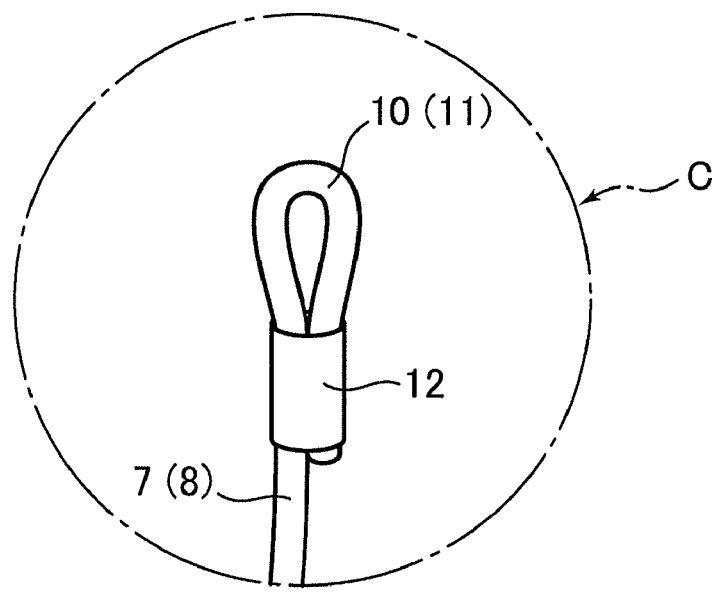
FIG. 4 is an enlarged view of portion C in FIG. 1.

FIG. 4 is an enlarged view of portion C in FIG. 1. First engaging part 10 and second engaging part 11 are ring-shaped engaging parts that are formed by folding the end sections of first string 7 and second string 8. The folded part of the end section is fixed by hard fastener 12. The folded part may also be fixed by sewing or melting. First engaging part 10 and second engaging part 11 may also be formed by attaching ring-shaped or hook-shaped hard elements to the ends of first string 7 and second string 8.

Figure 5:
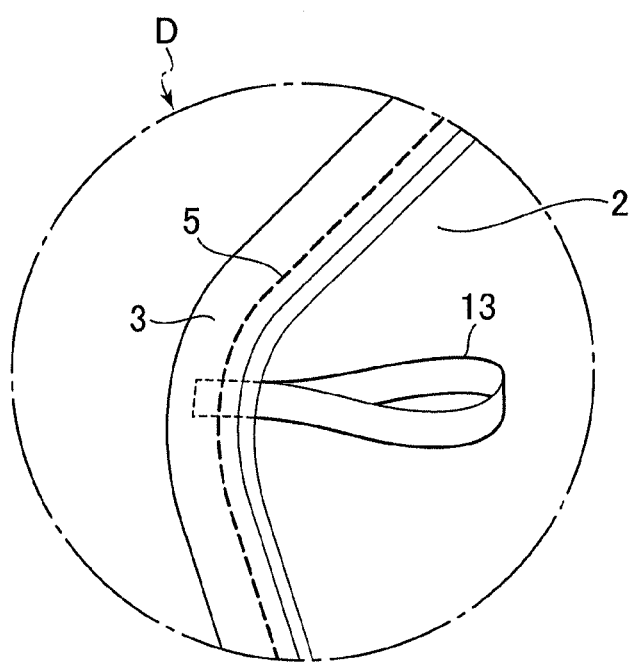
FIG. 5 is an enlarged view of portion D in FIG. 1.

FIG. 5 is an enlarged view of portion D in FIG. 1. Front engaging parts 13, likewise attaching elements 9, may be formed of a ribbon-shaped soft material. Specifically, the ribbon-shaped engaging element may be formed by inserting both ends of the soft material into hemmed part 3 together with sheet member 2 and by sewing them together at sewing part 5. Although not illustrated, hard cover members that have protrusions may be used as front engaging parts 13. In this case, rear seat back 14 may be provided with engaging members that have grooves so that the protrusions are slid along and engaged with the grooves. When tonneau cover 1 is removed and folded, tonneau cover 1 may be kept folded by engaging the protrusions on both sides with each other.

First strings 7, second strings 8 and front engaging parts 13 are provided on the lower surface of main body 6 in the embodiment, but these may be provided on the upper surface of main body 6. Nevertheless, a good appearance can be ensured by providing these on the lower surface of main body 6 because attaching elements 9, front engaging parts 13 and sewing parts 5 of hemmed part 3 are not visible to a passenger.

Figure 6:
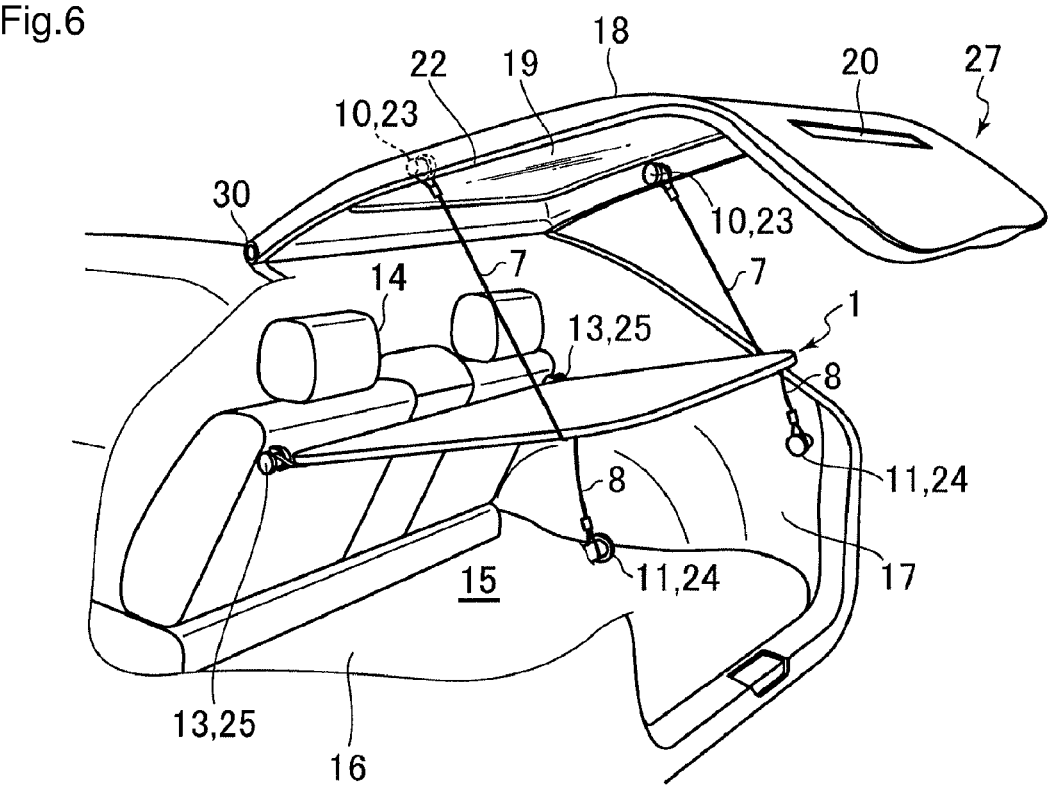
FIG. 6 is a schematic view of the luggage space and the tonneau cover when the back door is fully opened.

Next, the luggage space where tonneau cover 1 is arranged will be explained. FIG. 6 conceptually shows luggage space 15 and tonneau cover 1 when the back door is fully opened. Luggage space 15 is provided inside the vehicle behind rear seat back 14. Luggage space 15 is defined by rear seat back 14, floor 16, side walls 17 and back door 18. Back door 18 is allowed to pivot about rotational shaft 30. Back door 18 has main window shield 19 and sub-window shield 20 that is located below main window shield 19. Stepped portion 21 (see FIGS. 7B, 8B, 9B, 10A, 10B) is provided in luggage space 15 between main window shield 19 and sub-window shield 20. Luggage space 15 is partitioned into the upper part and the lower part by arranging tonneau cover 1 substantially horizontally, and baggage that is placed on floor 16 of luggage space 15 is prevented from being viewed from outside of the vehicle through main window shield 19 and sub-window shield 20.

Side trims 22 are arranged on the both sides of back door 18 in the vehicle width direction. First engaged parts 23 that are engaged with first engaging parts 10 of first strings 7 are provided on side trims 22 on both sides of back door 18. First engaged parts 23 may be provided on any portion of back door 18 other than side trims 22. Second engaged parts 24 that are engaged with second engaging parts 11 of second strings 8 are provided on side walls 17 on the rear side of the vehicle. Second engaged parts 24 may be provided on any portion of the vehicle main body other than side walls 17. Third engaged parts 25 that are engaged with front engaging parts 13 are provided on rear seat back 14. Third engaged part 25 may be provided on any portion of the vehicle interior part other than rear seat back 14. Tonneau cover 1, together with first to third engaged parts 23, 24, 25, constitutes tonneau cover apparatus 27.

The shapes of first to third engaged parts 23, 24, 25 are not limited as long as the engaging function is ensured. First to third engaged parts 23, 24, 25 may be, for instance, fixed pin elements or rotatory (retractable) hooks. The rotatory hook rotates and projects from a recess in order to engage with engaging parts 10, 11, 13 when tonneau cover 1 is in use and rotates back into the recess so that it becomes inconspicuous when tonneau cover 1 is not used. Engaging parts 10, 11, 13 may be hard male elements and corresponding engaged part 23, 24, 25 may be female elements that engage with and lock engaging parts 10, 11, 13. Engaging parts 10, 11, 13 may also be attached by means of magnets or hook-and-loop fasteners. Front engaging parts 13 may be hard protrusions and third engaged parts 25 may be recesses that engage with and lock front engaging parts 13.

Tonneau cover 1 is attached to a vehicle in the following steps. First, tonneau cover 1 in the unfolded state is inserted into luggage space 15 through the door opening when back door 18 is fully opened. Next, front engaging parts 13 are engaged with third engaged parts 25, and tonneau cover 1 is pivoted about front engaging parts 13 (third engaged parts 25). The rear end of tonneau cover 1 in the vehicle longitudinal direction is raised from the horizontal state, and in that state, first engaging parts 10 of first strings 7 are engaged with first engaged parts 23 of back door 18. Tonneau cover 1 is kept inclined due to the tension of first strings 7. Next, second engaging parts 11 of second strings 8 are engaged with second engaged parts 24 of side walls 17. Back door 18 is closed in this state so that tonneau cover 1 is substantially in the horizontal state. The reverse steps are taken when tonneau cover 1 is removed. Tonneau cover 1 that has been removed can be stored in any storing place inside or outside of the vehicle by folding tonneau cover 1 so that it is in a compact state.

Figure 7A:
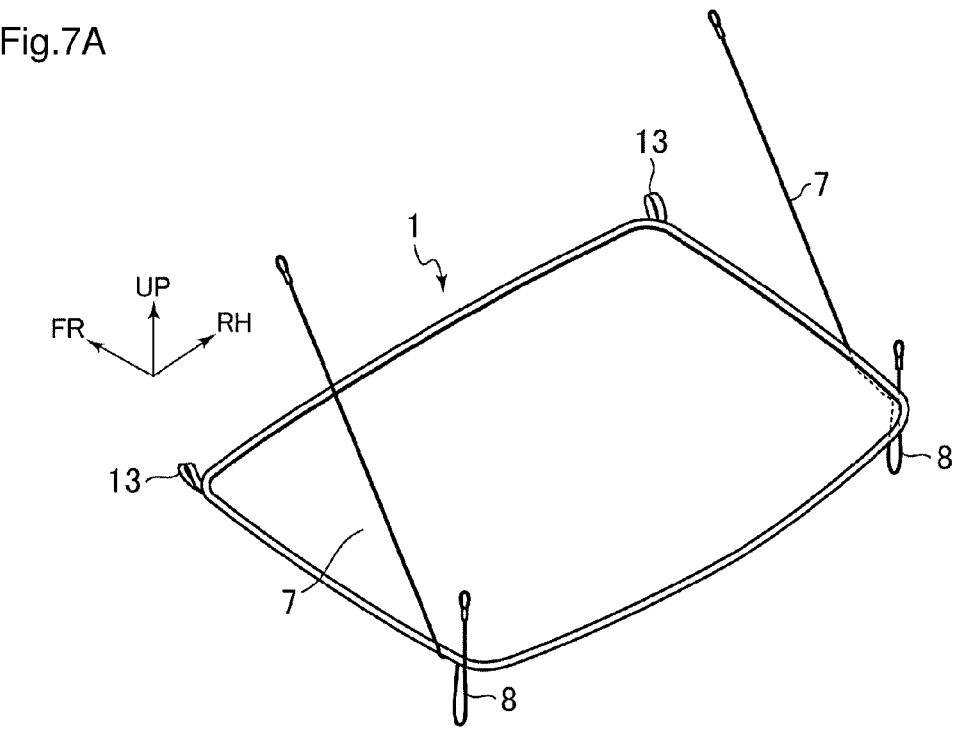
FIGS. 7A and 7B are schematic views of the tonneau cover when the back door is fully closed.
Figure 7B:
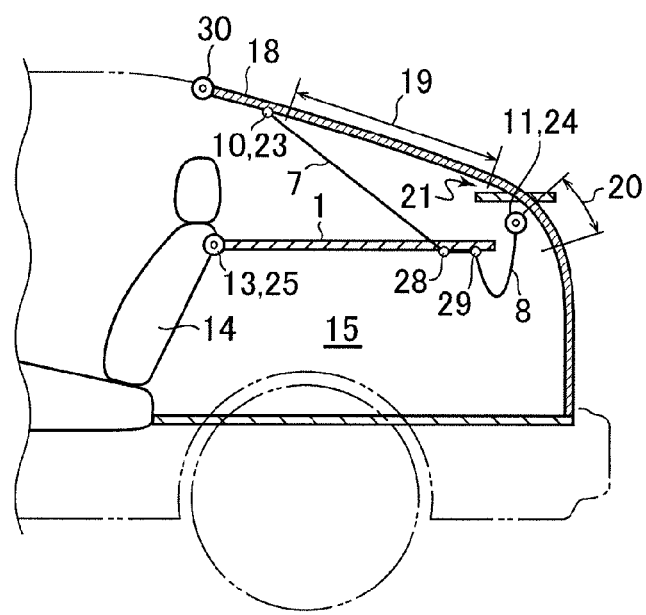

Referring to FIGS. 7A to 9, explanation will be given about how tonneau cover 1 works in connection with the opening/closing movement of back door 18 and how second strings 8 work when wind blows into the vehicle. FIGS. 7A and 7B show tonneau cover 1 when the back door is fully closed, wherein FIG. 7A is a perspective view showing tonneau cover 1 alone, and FIG. 7B is a side view of back door 18 and tonneau cover 1. Since first strings 7 suspend tonneau cover 1, first strings 7 are subjected to tension due to the weight of tonneau cover 1. When the back door is fully closed, tonneau cover 1 is kept in the horizontal state while first strings 7 are subjected to tension. Thus, the lower part of luggage space 15 is covered by tonneau cover 1. At this point, second strings 8 are loosened and are not subjected to any tension.

Figure 8A:
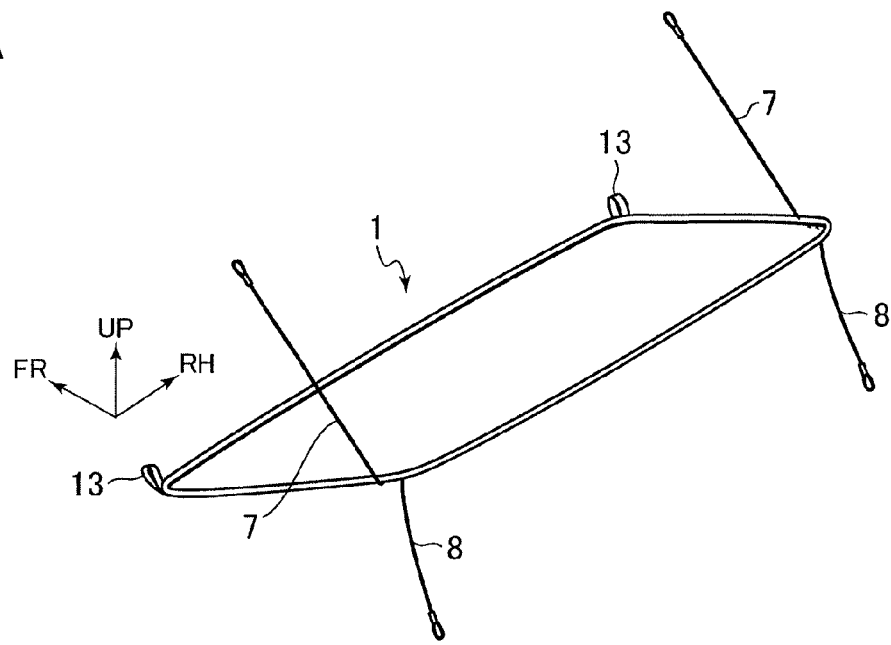
FIGS. 8A and 8B are schematic views of the tonneau cover when the back door is fully opened.
Figure 8B:
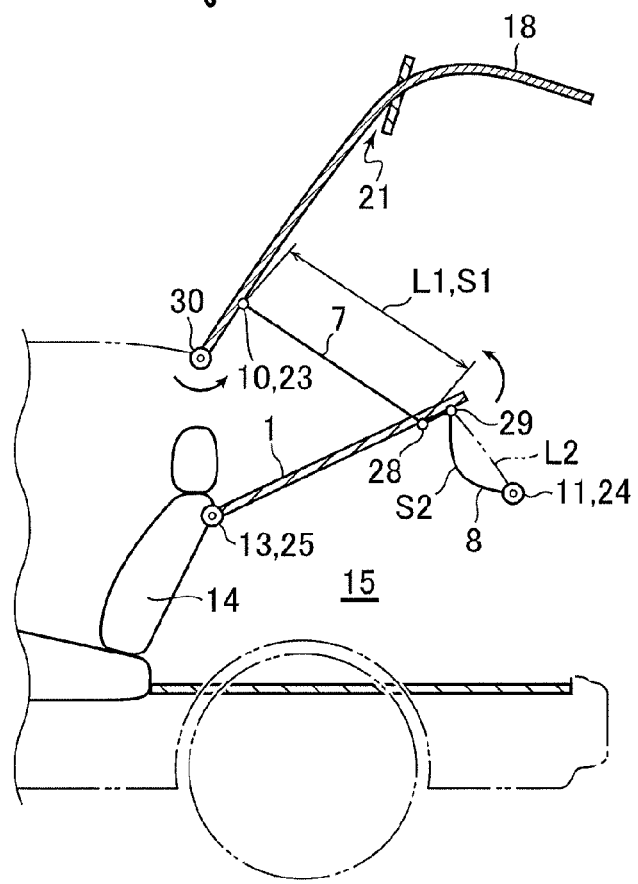

FIGS. 8A and 8B show tonneau cover 1 when the back door is fully opened, wherein FIG. 8A is a perspective view showing tonneau cover 1 alone, and FIG. 8B is a side view of back door 18 and tonneau cover 1. Since first strings 7 still suspend tonneau cover 1 when the back door is opened, first strings 7 are subjected to tension due to the weight of tonneau cover 1. Tonneau cover 1 pivots about front engaging parts 13 (third engaged parts 25) with the aid of the tension of first strings 7, and the rear end of tonneau cover 1 is raised upwards until reaching the state shown in FIG. 8B. Second connecting parts 29 are also raised when the pivoting tonneau cover 1 is raised, but second strings 8 are still in a loosened state. It should be noted that second engaging parts 11 and second engaged parts 24 are fixed points. When back door 18 is opened, direct distance L1 (a distance in a straight line or a distance as the crow flies) between first connecting part 28 and corresponding first engaging part 10 is equal to distance S1 between first connecting part 28 and corresponding first engaging part 10 that is measured along first string 7. Moreover, direct distance L2 between second connecting part 29 and corresponding second engaging part 11 is smaller than distance S2 between second connecting part 29 and corresponding second engaging part 11 that is measured along second string 8. When back door 18 is closed from the state shown in FIG. 8B, in which back door 18 is fully opened, the rear end of tonneau cover 1 is lowered back to the original position shown in FIG. 7B while first strings 7 are subjected to tension.

Figure 9:
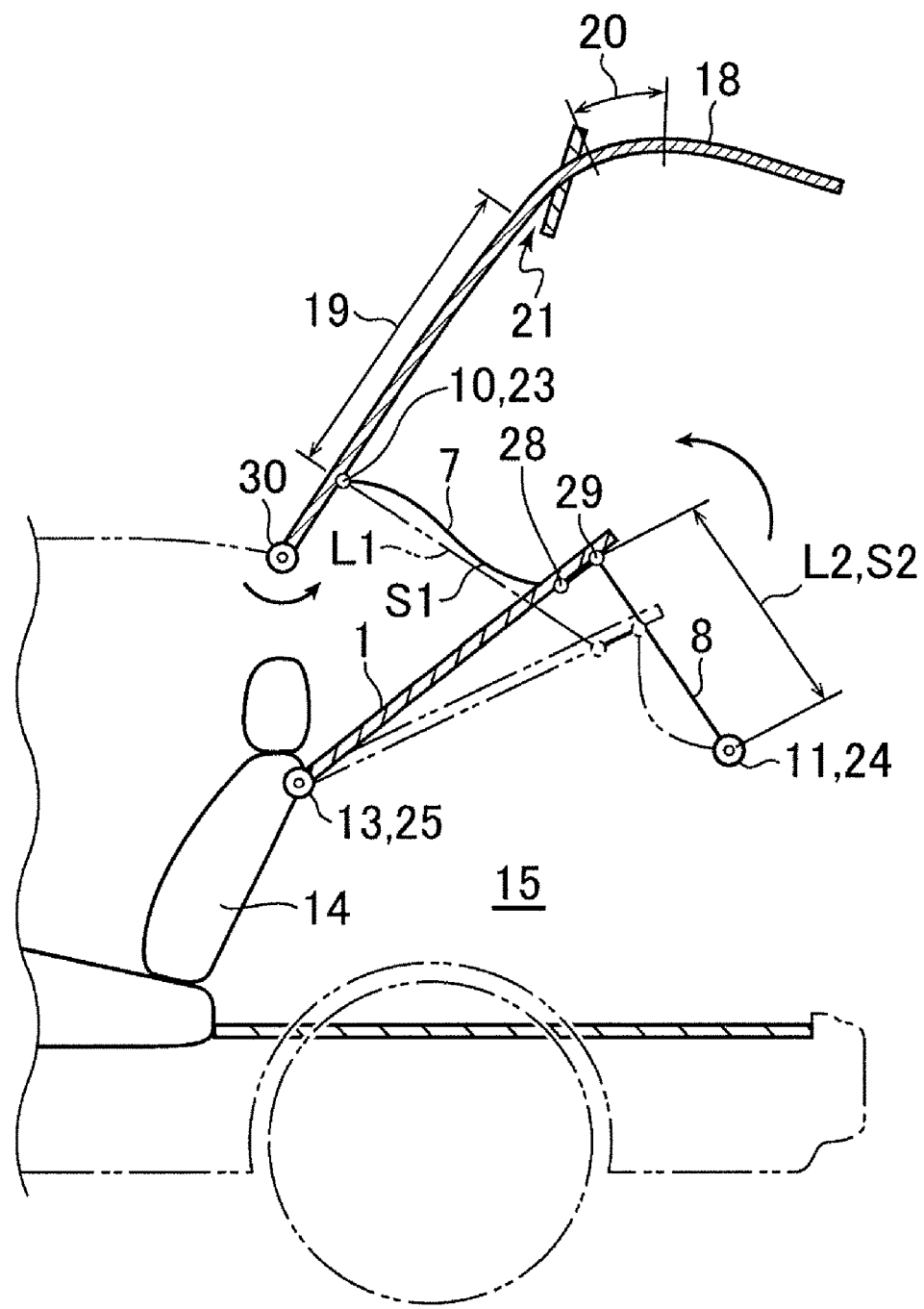
FIG. 9 is a schematic view of the tonneau cover that has been moved when the back door was fully opened.

FIG. 9 shows the tonneau cover when the main body is raised by the back door that was fully opened. When wind blows into luggage space 15 from the back side of the vehicle, with back door 18 fully opened, as shown in FIG. 8B, the rear end of tonneau cover 1 is further raised, as shown by the arrow, and this loosens first strings 7. The reasons why tonneau cover 1 is caused to pivot from the position shown in FIG. 8B are not limited to the wind, provided that tonneau cover 1 is moved in the direction that causes first strings 7 to loosen. The loosening of first strings 7 is equivalent to that direct distance L1 between first connecting part 28 and corresponding first engaging part 10 becomes smaller than distance S1 between first connecting part 28 and corresponding first engaging part 10 that is measured along first string 7. Then looseness is lost and tension is generated in second strings 8. The rear end of tonneau cover 1 is prevented from being further raised and from abutting against back door 18, as shown in FIG. 9. Direct distance L2 between second connecting part 29 and corresponding second engaging part 11 is equal to distance S2 between second connecting part 29 and corresponding second engaging part 11 that is measured along second string 8.

Figure 10A:
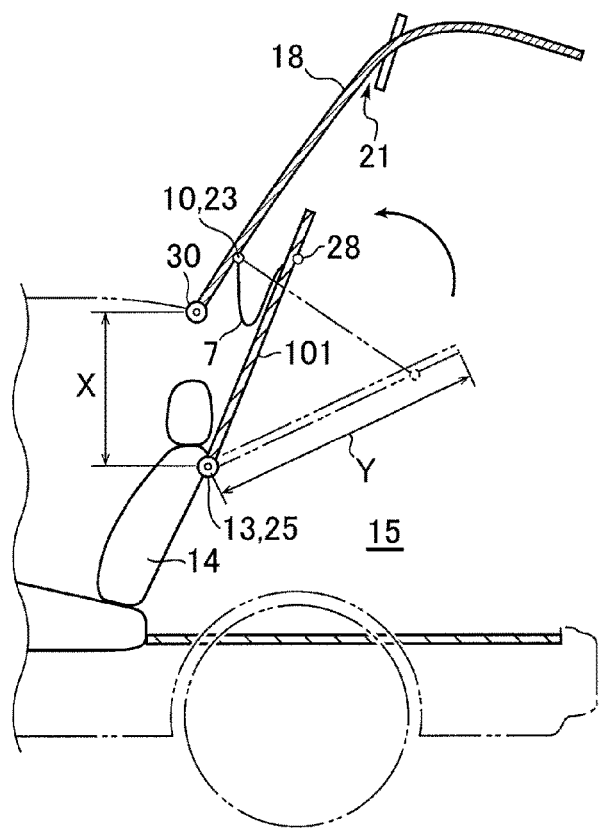
FIGS. 10A and 10B are schematic views of the tonneau cover according to a comparative example.
Figure 10B:
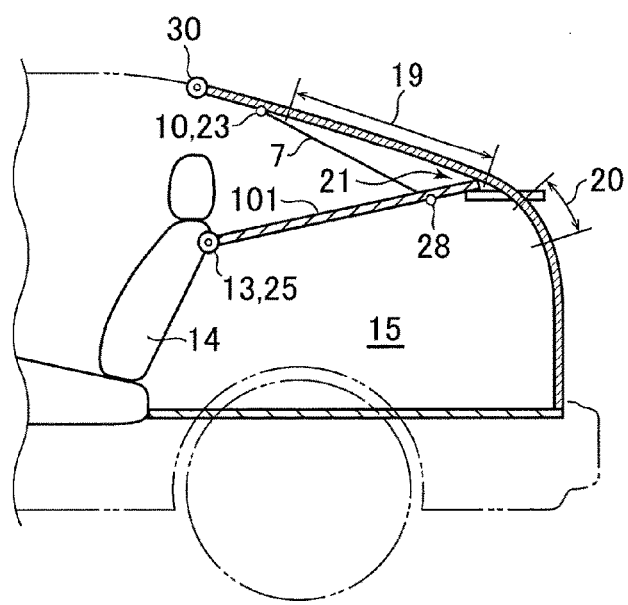

FIGS. 10A and 10B show a comparative example of tonneau cover 101 in use. The comparative example is the same as the embodiment described above except that second strings 8 are not provided. Tonneau cover 101 works in the same manner as the embodiment when second strings 8 are loosened. Specifically, when back door 18 is fully opened or fully closed, tonneau cover 101 works in the same manner as the embodiment that is described with reference to FIGS. 8A to 9. FIG. 10A shows tonneau cover 101 when back door 18 is fully opened. The rear end of tonneau cover 101 is raised from the position depicted with the dotted line by wind that blows into the vehicle. Tonneau cover 101, which is not provided with second strings 8, largely pivots as compared to FIG. 9 and causes large looseness in first strings 7. If back door 18 is closed when tonneau cover 101 is in contact with back door 18, then the end of tonneau cover 101 may be caught in stepped portion 21 between main window shield 19 and sub-window shield 20, as shown in FIG. 10B. Tonneau cover 101, the rear end of which is raised, covers sub-window shield 20 when viewed from the driver's seat (more precisely, through the rearview mirror) and deteriorates the driver's view.

In the comparative example, the rear end of tonneau cover 101 that is flapped by wind abuts against back door 18 and is stopped by back door 18 because length Y of tonneau cover 101 in the vehicle longitudinal direction shown in FIG. 10A is longer than vertical dimension X between rotational shaft 30 of back door 18 and front engaging part 13. However, when length Y of the tonneau cover in the vehicle longitudinal direction is shorter than dimension X, or when a vehicle has luggage space 15 having a small dimension in the vehicle longitudinal direction, the tonneau cover that is flapped by wind may continue to pivot about front engaging parts 13 without abutting against any object until the rear end of the tonneau cover moves beyond rear seat back 14 and hits against a passenger's head. Accordingly, damage to a passenger can also be prevented by second strings 8 of the invention when length Y of tonneau cover 1 in the vehicle longitudinal direction is shorter than dimension X.

Further, according to the invention, it is possible to wind first strings 7 and second strings 8 around tonneau cover 1 and to bind up tonneau cover 1 with first strings 7 and second strings 8 when tonneau cover 1 is unfolded. Thus, tonneau cover 1 can be bound such that when in the folded state, it cannot be abruptly released. In addition, tonneau cover 1 in the unfolded state may be attached to the front window shield, the back window shield or the side window shield as a sunshade. In this case, first strings 7, second strings 8 and front engaging parts 13 may be wound around or engaged with any part of the interior of the vehicle as a means for fixing the sunshade.

Although a certain preferred embodiment(s) of the present invention has (have) been shown and described in detail, it should be understood that various changes and modifications may be made without departing from the spirit or scope of the appended claims.

REFERENCE NUMERALS 1 tonneau cover
2 sheet member
3 hemmed part
4 metal wire
5 sewing part
6 main body of the tonneau cover
7 first string
8 second string
9 attaching element
10 first engaging part
11 second engaging part
12 fastener
13 front engaging part
14 rear seat back
15 luggage space
16 floor
17 side wall
18 back door
19 main window shield
20 sub-window shield
21 stepped portion
22 side trim
23 first engaged part
24 second engaged part
25 third engaged part
26 rear end of the main body
27 tonneau cover apparatus
28 first connecting part
29 second connecting part
30 rotational shaft
31 ring

What is claimed is:
1. A tonneau cover that covers a luggage space that is positioned on a rear side of a vehicle comprising:
   a main body that includes a front engaging part on a front side of the main body, wherein the front engaging part is engaged with an interior part of the vehicle, and the main body is pivotable about the front engaging part;
   a first string that includes a first connecting part that is connected to the main body at a position that is rearward of the front engaging part and a first engaging part that is engaged with a pivotable back door; and
   a second string that includes a second connecting part that is connected to the main body at a position that is rearward of the front engaging part and a second engaging part that is engaged with a vehicle main body that defines the luggage space,
   wherein the first string is subjected to tension due to weight of the main body and the second string is loosened in a state in which the back door is opened, and when the main body is moved to a direction that causes the first string to loosen in said state, the second string is subjected to tension, and
   the main body includes a sheet member that covers the luggage space and a hemmed part that surrounds a periphery of the sheet member, the first string and the second string are formed integral as a single continuous string, and the first and second connecting parts are formed by fixing the single continuous string to the hemmed part at a middle point of the single continuous string.

2. The tonneau cover according to claim 1, wherein the sheet member is foldable, and the hemmed part houses a deformable wire that extends along the periphery of the sheet member.

3. A tonneau cover apparatus comprising:
   the tonneau cover according to claim 1;
   a first engaged part that is provided on the back door and that is engaged with the first engaging part;
   a second engaged part that is provided on the vehicle main body and that is engaged with the second engaging part; and
   a third engaged part that is provided on the interior part of the vehicle and that is engaged with the front engaging part.

4. A tonneau cover that covers a luggage space that is positioned on a rear side of a vehicle comprising:
   a main body that includes a front engaging part on a front side of the main body, wherein the front engaging part is engaged with an interior part of the vehicle, and the main body is pivotable about the front engaging part;
   a first string that includes a first connecting part that is connected to the main body at a position that is rearward of the front engaging part and a first engaging part that is engaged with a pivotable back door; and
   a second string that includes a second connecting part that is connected to the main body at a position that is rearward of the front engaging part and a second engaging part that is engaged with a vehicle main body that defines the luggage space,
   wherein, in a state in which the back door is opened, a direct distance between the first connecting part and the first engaging part is equal to a distance between the first connecting part and the first engaging part that is measured along the first string, and a direct distance between the second connecting part and the second engaging part is smaller than a distance between the second connecting part and the second engaging part that is measured along the second string, and
   wherein when the main body is moved in said state such that the direct distance between the first connecting part and the first engaging part is smaller than the distance between the first connecting part and the first engaging part that is measured along the first string, the direct distance between the second connecting part and the second engaging part is equal to the distance between the second connecting part and the second engaging part that is measured along the second string.

5. The tonneau cover according to claim 4, wherein the main body includes a sheet member that covers the luggage space and a hemmed part that surrounds a periphery of the sheet member, the first string and the second string are formed integral as a single continuous string, and the first and second connecting parts are formed by fixing the single continuous string to the hemmed part at a middle point of the single continuous string.

6. The tonneau cover according to claim 5, wherein the sheet member is foldable, and the hemmed part houses a deformable wire that extends along the periphery of the sheet member.

7. A tonneau cover apparatus comprising:
the tonneau cover according to claim 4;
a first engaged part that is provided on the back door and that is engaged with the first engaging part;
a second engaged part that is provided on the vehicle main body and that is engaged with the second engaging part; and
a third engaged part that is provided on the interior part of the vehicle and that is engaged with the front engaging part.

* * * * *